US 9,884,576 B1

(12) United States Patent
McLoughlin

(10) Patent No.: US 9,884,576 B1
(45) Date of Patent: Feb. 6, 2018

(54) COMBINATION LOADING SYSTEM AND HOSE BED FOR A FIREFIGHTING VEHICLE

(71) Applicant: John E. McLoughlin, Hauppage, NY (US)

(72) Inventor: John E. McLoughlin, Hauppage, NY (US)

( * ) Notice: Subject to any disclaimer, the term of this patent is extended or adjusted under 35 U.S.C. 154(b) by 0 days.

(21) Appl. No.: 15/598,908

(22) Filed: May 18, 2017

(51) Int. Cl.
*B60P 1/43* (2006.01)
*B60P 1/54* (2006.01)
*A62C 33/04* (2006.01)

(52) U.S. Cl.
CPC .............. *B60P 1/435* (2013.01); *A62C 33/04* (2013.01); *B60P 1/438* (2013.01); *B60P 1/549* (2013.01); *B60P 1/5428* (2013.01)

(58) Field of Classification Search
CPC .......... A62C 33/04; B60P 1/003; B60P 1/435; B60P 1/438; B60P 1/5428; B60P 1/549; B60P 7/0876
See application file for complete search history.

(56) References Cited

U.S. PATENT DOCUMENTS

| | | | | |
|---|---|---|---|---|
| 2,533,823 A * | 12/1950 | Lee | ......................... | A62C 33/04 248/91 |
| 2,721,758 A * | 10/1955 | Allen | ...................... | B60P 1/435 296/61 |
| 3,460,696 A * | 8/1969 | Owen, Jr. | .................. | B60P 3/42 296/157 |
| 4,072,242 A * | 2/1978 | Cook | ......................... | B60P 1/38 414/505 |
| 4,702,511 A * | 10/1987 | Olins | ......................... | B60P 1/26 296/57.1 |
| 5,169,202 A * | 12/1992 | Cupp | ...................... | B60P 1/435 296/57.1 |
| 5,769,593 A * | 6/1998 | Buffaloe | .................. | B60P 1/435 296/57.1 |
| 6,062,503 A * | 5/2000 | Blair | ....................... | A62C 33/04 220/491 |
| 6,135,532 A * | 10/2000 | Martin | ...................... | B60P 3/36 414/537 |
| 6,971,827 B1 * | 12/2005 | Embach | ................ | B60P 7/0876 296/97.23 |

(Continued)

FOREIGN PATENT DOCUMENTS

KR 1709676 B1 * 2/2017 ............. A62C 33/04

*Primary Examiner* — James Keenan

(57) ABSTRACT

A combination loading system and hose bed for a firefighting vehicle includes a platform and an actuating mechanism configured to pivot the platform between a substantially vertical stowed position, a substantially horizontal position, and a downwardly angled position. The platform includes a bottom wall and a pair of side walls extending substantially perpendicular to the bottom wall. When in the stowed position, the platform closes the substantially open rear end of the firefighting vehicle, and when in the substantially horizontal position, the platform can serve as a hose bed allowing firefighters to easily grab hose from a standing position. When in the downwardly angled position, the platform can serve as a ramp allowing the firefighters to wheel equipment on and off the vehicle. The platform may also be provided with a crane extension for lifting heavy objects.

25 Claims, 9 Drawing Sheets

(56) References Cited

U.S. PATENT DOCUMENTS

| | | | | |
|---|---|---|---|---|
| 7,347,476 | B2* | 3/2008 | Luehr | B60J 5/108 296/146.8 |
| 7,419,204 | B2* | 9/2008 | Coble | B60P 1/435 296/146.9 |
| 8,105,007 | B2* | 1/2012 | Dunkel | B60P 1/433 296/156 |
| 9,114,692 | B2* | 8/2015 | Kerr, III | B60J 5/108 |
| 9,545,867 | B2* | 1/2017 | Melancon, Jr. | B60P 1/435 |
| 2007/0231114 | A1* | 10/2007 | Westrate | B60P 1/435 414/545 |
| 2008/0145172 | A1* | 6/2008 | Sturt | B60P 7/0876 410/118 |
| 2014/0093342 | A1* | 4/2014 | King | B60P 1/43 414/523 |
| 2016/0144758 | A1* | 5/2016 | Knapp | B60P 1/435 414/537 |

* cited by examiner

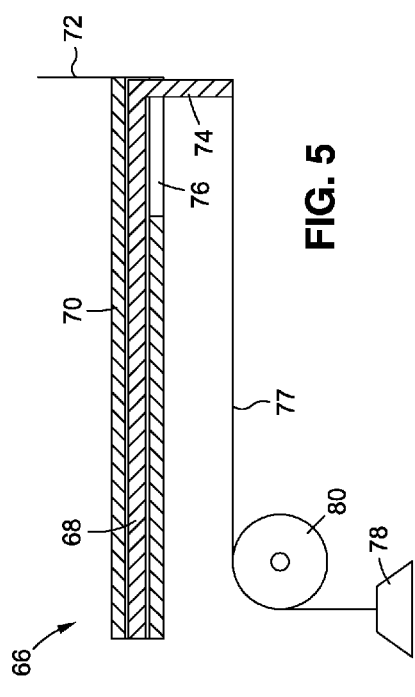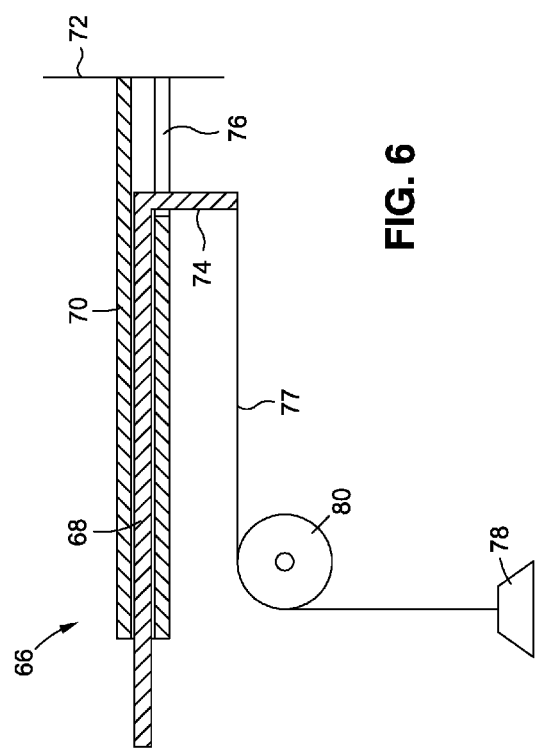

COMBINATION LOADING SYSTEM AND HOSE BED FOR A FIREFIGHTING VEHICLE

TECHNICAL FIELD

The present disclosure relates in general to firefighting equipment and more particularly to a combination loading system and hose bed for a firefighting vehicle.

BACKGROUND

Firefighting vehicles transport various types of gear, including ladders, hoses, light towers, generators, and medical equipment, to and from the scene of a fire. Much of this equipment is heavy and unwieldy, making it difficult to quickly load or unload from the vehicle. Some items can be placed on heavy wheeled carts that can be rolled up and down a removable ramp stowed in the back of the vehicle with the rest of the equipment. However, setting up and correctly positioning the ramp can take up valuable time that would be better spent extinguishing the fire.

Storing, deploying and reloading hose can be especially problematic. Typically, the hose is coiled or stacked in a hose bed at the rear of the truck, but there is some disagreement about the best shape and location for the hose bed. Some fire companies prefer deep, tall hose beds since these can store maximum lengths of hose without sacrificing tank size, while others prefer low hose beds that are easy to access. Either way, there is a tradeoff. Tall hose beds require firefighters to climb up steps, increasing the chance of injury, as well as the amount of time it takes to deploy the hose. Low hose beds are generally safer because they allow firefighters to quickly grab the hose from a standing position with both feet on the ground, but they reduce the amount of space available for water tanks and other equipment. These and other problems of existing hose beds and ramps are addressed by the present disclosure as summarized below.

SUMMARY

A combination loading system and hose bed for a firefighting vehicle includes a platform and an actuating mechanism configured to pivot the platform between a substantially vertical stowed position, a substantially horizontal position, and a downwardly angled position. The platform includes a bottom wall and a pair of side walls extending substantially perpendicular to the bottom wall. When in the stowed position, the platform closes the substantially open rear end of the firefighting vehicle, and when in the substantially horizontal position, the platform can serve as a hose bed allowing firefighters to easily grab hose from a standing position. When in the downwardly angled position, the platform can serve as a ramp allowing the firefighters to wheel equipment on and off the vehicle.

The actuating mechanism includes a spring urging the distal end of the platform distally, at least one cable securing the platform to at least one rotatable reel, and a push mechanism configured to initiate distal movement of the distal end of the platform. In one embodiment, the push mechanism includes at least one push rod coupled to a counterweight assembly. In another embodiment, the push mechanism comprises at least one air piston. In yet another embodiment, the push mechanism comprises at least one gear motor.

The rotatable reels are preferably coupled to a two-way motor controlled by a control system that is programmed to energize the motor when lowering or raising the platform, and to stop the motor when sensors on the platform or the vehicle detect that the platform is in the desired position.

In one embodiment of the invention, a crane extension may be coupled to the platform. The crane extension comprises an arm having a proximal end pivotably connected to a distal end of the platform and a distal end supporting a pulley assembly configured to raise and lower a hook from the distal end of the arm. The arm is movable between a first position wherein the arm overlies the platform with the distal end of the arm extending toward the proximal end of the platform, to a second position wherein the arm is coplanar with the platform, with the distal end of the arm extending distally away from the distal end of the platform.

BRIEF DESCRIPTION OF THE DRAWINGS

FIG. 5 is a sectional view of the push mechanism of FIGS. 1-4 in a retracted position.

FIG. 6 is a sectional view of the push mechanism of FIGS. 1-4 in an extended position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
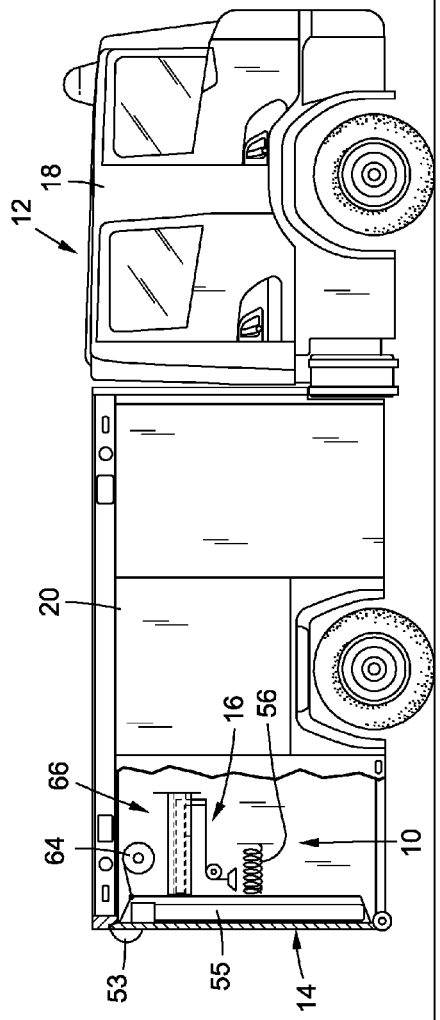
FIG. 1 is a side view of a firefighting vehicle, with a portion broken away to show an apparatus according to the present disclosure being used as a hose bed and with the platform in the stowed position.
Figure 2:
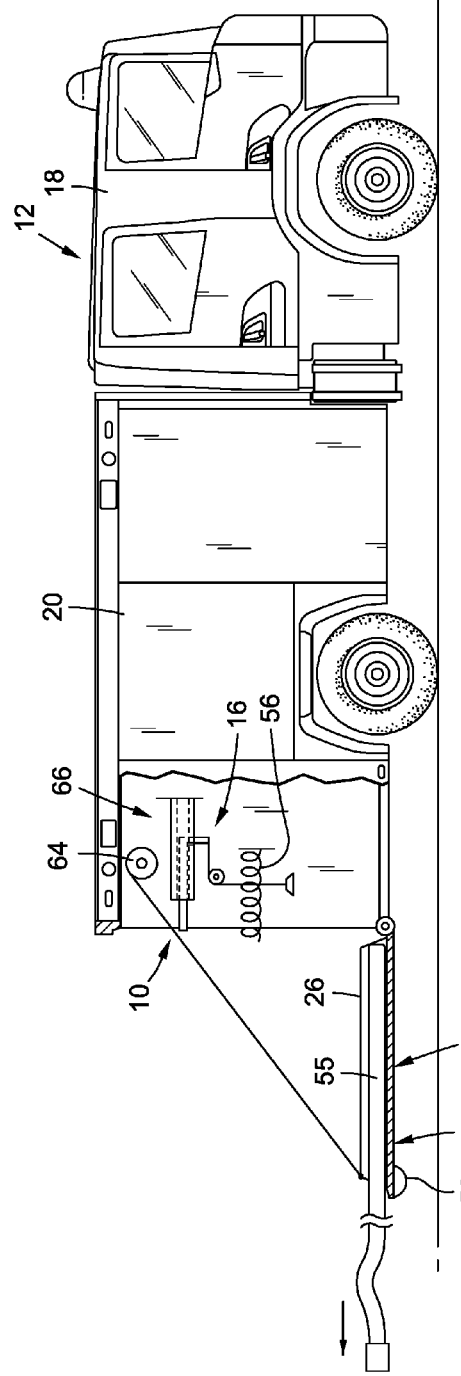
FIG. 2 is a view similar to FIG. 1, with the apparatus being used as a hose bed and with the platform in the horizontal position.
Figure 3:
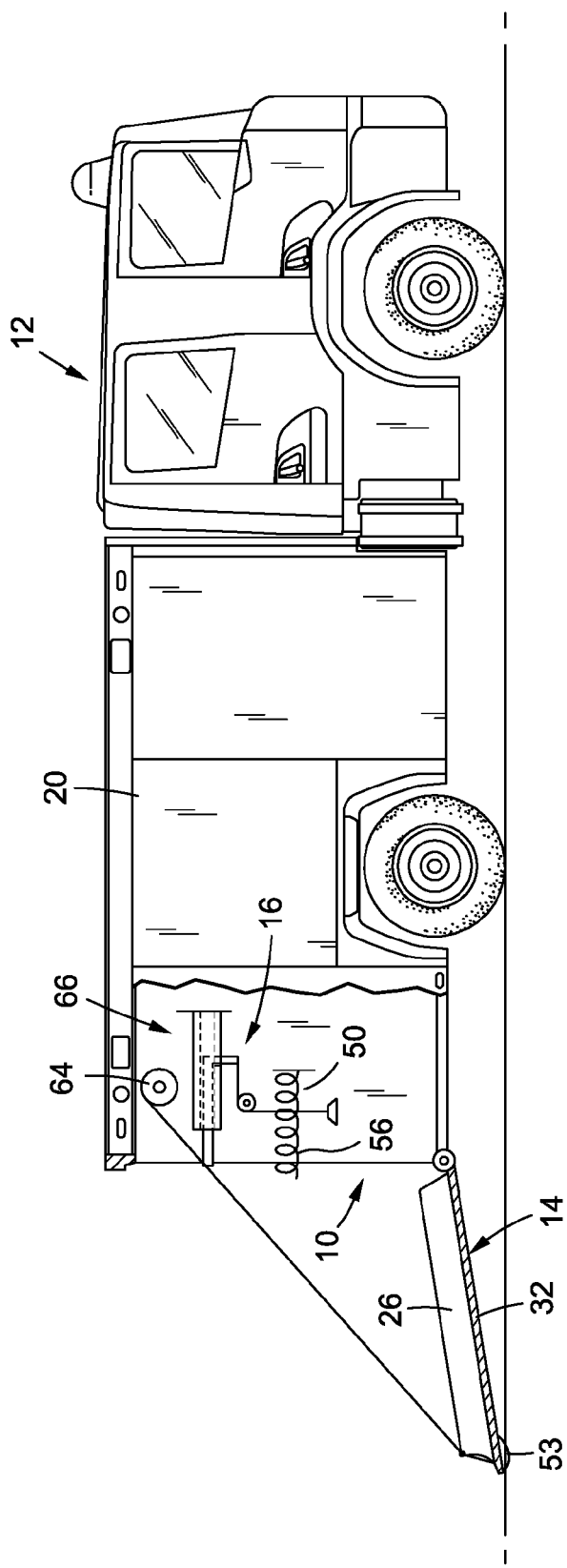
FIG. 3 is a view similar to FIG. 1, with the apparatus being used as a loading ramp in the downwardly angled position.
Figure 4:
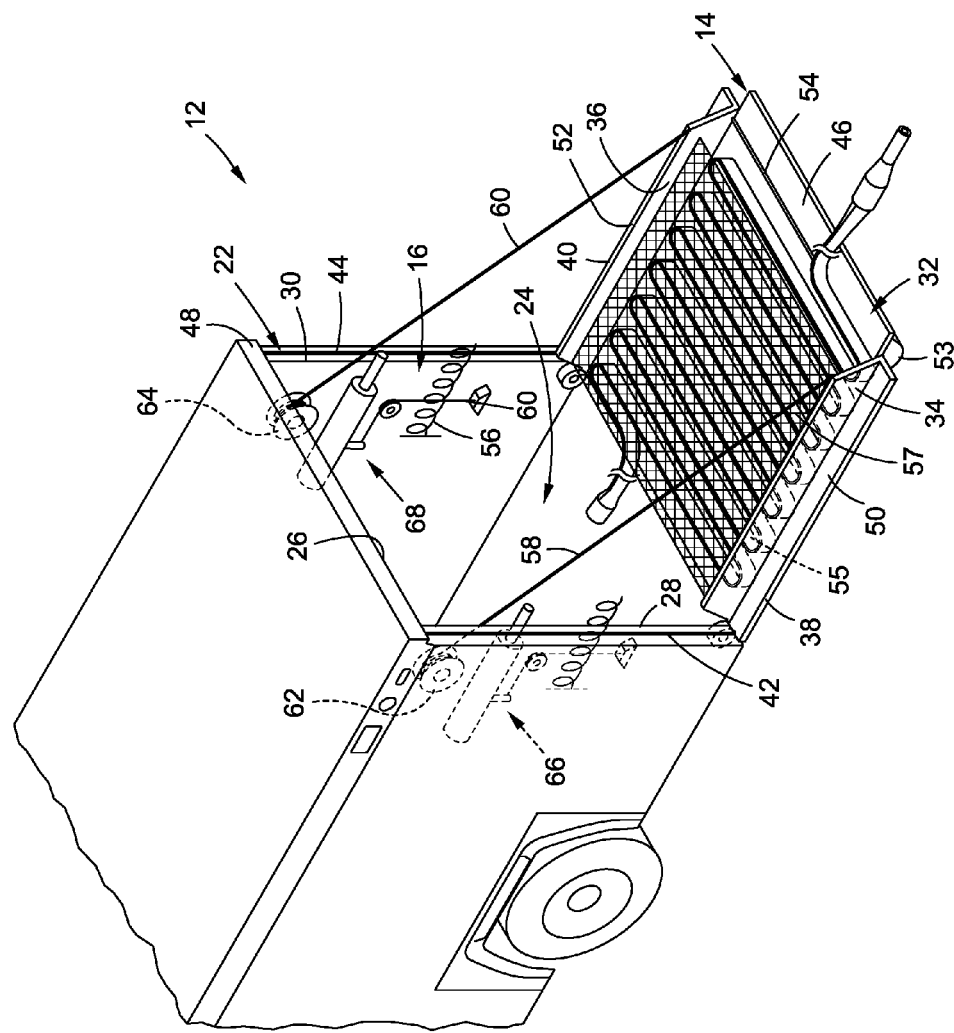
FIG. 4 is a perspective view of the rear portion of a firefighting vehicle, with the apparatus being used as a hose bed and with the platform in the horizontal position.

FIGS. 1, 2, and 4 show an apparatus according to the present disclosure, indicated in its entirety by the numeral 10, being used as a hose bed in a firefighting vehicle 12. FIG. 3 shows the apparatus 10 being used as a loading ramp. For purposes of illustration, the apparatus 10 is shown mounted in the rear wall of the vehicle and configured to pivot in a rearward direction. However, the apparatus may be located anywhere in the rear portion of the vehicle, where the rear portion is defined as anywhere behind the cab 18. For instance, the apparatus could be mounted in an opening in a side wall of the vehicle and configured to pivot in a laterally outward direction.

The apparatus 10 includes a platform 14 and an actuating mechanism 16 that moves the platform 14 between the substantially vertical stowed position shown in FIG. 1, the substantially horizontal (or parallel to the ground) position shown in FIGS. 2 and 4, and the downwardly angled position shown in FIG. 3. As best seen in FIG. 4, the platform 14 includes a bottom wall 32 and two opposite side walls 34, 36 that extend perpendicular to the bottom wall 32. A pair of side flanges 38, 40 extend laterally outwardly from the side walls 34, 36, and are substantially coplanar with the bottom wall 32. The dimensions of the platform 14 are selected such that when the platform 14 is in the vertical stowed position shown in FIG. 1, the bottom wall 32 completely closes the opening 24 in the rear wall 22 of the vehicle 12, the side walls 34, 36 extend into the interior of the vehicle 12, and the side flanges 38, 40 extend beyond the side edges 28, 30 of the opening 24 and are flush with the lateral edge portions 42, 44 of the rear wall surrounding the opening 24. In addition, the bottom wall 32 of the platform 14 includes a distal edge portion 46 that extends beyond the top edge 26 of the opening 24 and lies flush with the top peripheral edge portion 48 of the rear wall surrounding the opening 24 when the platform is stowed. Seals 50, 52, 54 are preferably provided on or in the side flanges 38, 40 and the distal edge portion 46 of the platform 14, or on the corresponding portions of the rear wall 22 of the vehicle, so that the platform 14 tightly closes the opening 24. A bumper 53 on the outer surface of the distal edge portion 46 of the bottom wall 32 protects the bottom wall 32 from damage when it contacts the ground.

When used as a hose bed, the platform 14 supports a length of hose 55 that may be coiled, stacked, or folded on the bottom wall 32. The platform 14 may optionally include dividers for neatly separating portions of the hose 55 from one another and preventing tangling. In addition, a restraining system such as a net 57 is provided for keeping the hose in place when the platform 14 is in the vertical position. Alternatively, when used as a loading ramp, the platform 14 may include tie-downs for holding equipment in place before unloading.

Figure 9:
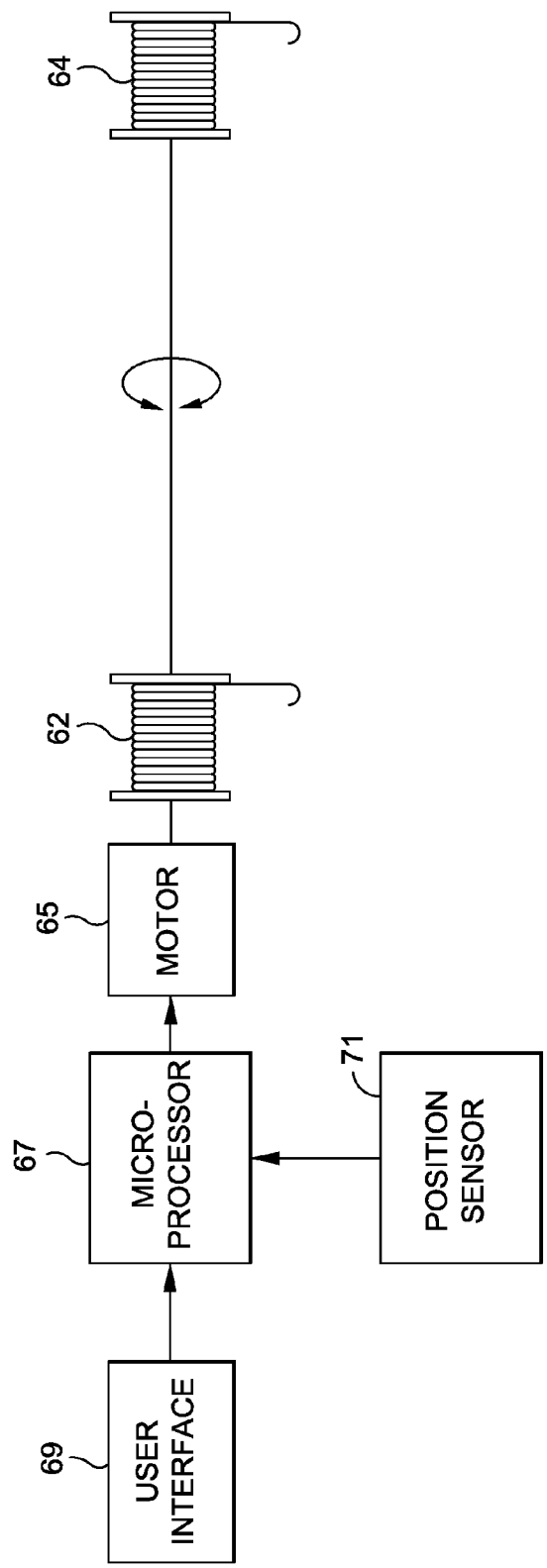
FIG. 9 is a schematic drawing of a control system according to the disclosure.

The actuating mechanism 16 includes at least one spring 56 mounted in the rear end of the vehicle 12 and configured to urge the distal end 46 of the platform 14 outwardly. The spring 56 may be secured to a bracket or other structure located in the center of the open back end of the vehicle 12, or it may be secured to one of the edge portions of the rear wall 22. Alternatively, two or more springs could be provided, with at least one spring positioned at or near each lateral edge portion 42 of the rear wall 22 of the vehicle. The platform 14 is maintained in the vertical stowed position, against the bias of the spring or springs 56, by a pair of cables 58, 60, each of which has a first end secured to one of the distal corners of the platform 14 and a second end coiled about a reel 62, 64 mounted in the open back end of the vehicle 12. Alternatively, rather than a pair of cables carried on a pair of reels and coupled to the distal corners of the platform 12, a single cable could be carried on a single reel and coupled to the center of the distal edge portion 46 of the platform 14. As best seen in FIG. 9, the reel or reels 62, 64 are preferably mounted on the shaft of a two-way variable speed motor 65, preferably a worm-gear type motor, that receives input from an onboard or remote microprocessor 67. The microprocessor 67 may receive input from a user interface device 69 such as a touch screen or mechanical controls located on the dashboard of the firefighting vehicle, or on a wireless handset carried by a firefighter. In addition, the microprocessor receives signals from a position sensor or sensors 71 that detect whether the platform 14 is in a desired position.

The actuating mechanism 16 further includes a push mechanism 66 (or a pair of push mechanisms 66, 68) configured to initiate distal movement of the distal edge portion 46 of the platform 14. If a single push mechanism 66 is used, it may be supported by a bracket or other fixture in the center of the opening 24 at the rear of the vehicle 12. If two push mechanisms 66, 68 are used, each may be located proximate opposite side edges 28, 30 of the opening. In one embodiment, best seen in FIGS. 5 and 6, a push mechanism 66 comprises a push rod 68 slidably mounted within a cylindrical sleeve 70 secured to a mounting bracket 72. A connector plate or bar 74 coupled to the proximal end of the push rod 68 extends through a slot 76 in the lower proximal end of the sleeve 70. The bottom end of the connector bar 74 is coupled to a counterweight cable 77 having a weight 78 suspended from one end. An intermediate portion of the counterweight cable 77 between the bar 74 and the weight 78 is supported by a counterweight pulley 80 located distally of the connector bar 74.

Operation of the actuating mechanism 16 is as follows. Initially, the platform 14 is vertical, as shown in FIG. 1, and the cables 58, 60 are fully coiled about the reels 62, 64. The platform 14 exerts a compressive force on the spring 56, and holds the push rod 68 in the fully retracted position shown in FIG. 5, with the bar 74 located at the proximal end of the slot 76. When an operator wishes to lower the platform 14, he or she inputs a command through the user interface 69, activating the motor 65, causing the reels 62 to rotate in a first direction, unwinding the cables 58, 60. As the cables 58 begin to unwind, the force exerted by the platform 14 on the spring 56 and the push rod 68 decreases, allowing the spring 56 to extend and the push rod 68 to move forward in the sleeve, as shown in FIG. 6. The spring 56 and push rod 68 push the platform 14 outwardly until gravity takes over, causing the platform 14 to be pulled downwardly by its own weight. At this point, the motor 65 may be reversed, causing the reels 62, 64 to rotate in a second direction, opposite the first direction. This tightens the cables 58, 60 and counters the force of gravity so that the platform does not drop too quickly. Finally, when the position sensors 71 detect that the platform 14 has reached its desired position (ie. the horizontal position shown in FIG. 2 if the apparatus is being used as a hose bed, or angled downwardly as shown in FIG. 3 if the apparatus is being used as a loading ramp), a limit switch is actuated, de-energizing the motor 65 and preventing any further movement of the platform.

When the operator wishes to raise the platform, he or she again she inputs a command through the user interface 69, reactivating the motor 65 and causing the reels 62 to rotate in the second direction, winding the cables 58, 60 and pulling upwardly on the platform 14. The platform 14 continues to rise until it contacts the spring 56 and rod 68, pushing them inwardly. When the spring 56 is fully compressed and the rod 68 has returned to its initial position as shown in FIG. 5, the position sensors 71 will detect that the platform is in its stowed position and deactivate the motor.

Figure 7:
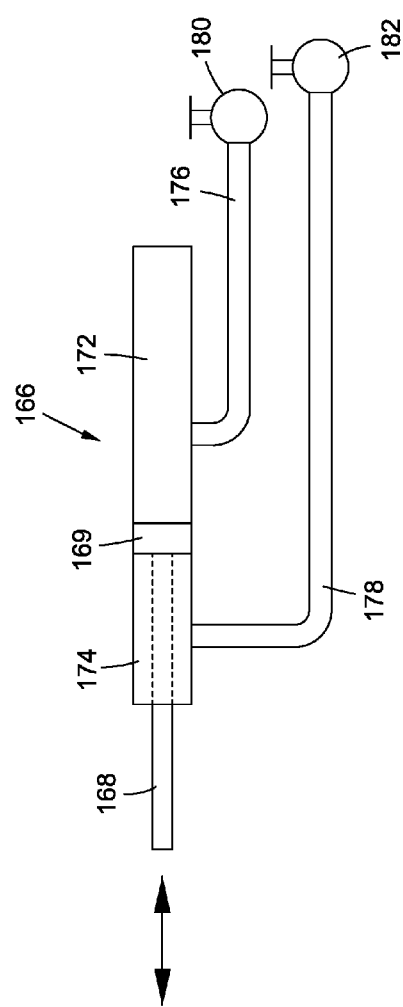
FIG. 7 is a side view of a push mechanism according to an alternate embodiment of the disclosure.

A push mechanism 166 according to an alternate embodiment of the invention is shown in FIG. 7. A push rod 168 projects in a distal direction from a piston 169 mounted for sliding movement in a cylinder 170 and dividing the cylinder 170 into a proximal chamber 172 and distal chamber 174. A first conduit 176 communicates with the proximal chamber 172 and a second conduit 178 communicates with the distal chamber 174. First and second valves 180, 182 located in the first and second conduits 176, 178, respectively, control the flow of an operating fluid such as air or water into the chambers 172, 174. When the first valve 180 is open and the second valve 182 is closed, the operating fluid can enter the proximal chamber 172, pushing the piston 169 and rod 168 distally against the platform 14, causing it to move downwardly. Conversely, when the first valve 180 is closed and the second valve 182 is open, the operating fluid can enter the distal chamber 174, pushing the piston 169 and rod 168 proximally, allowing the platform 14 to be raised.

Figure 8:
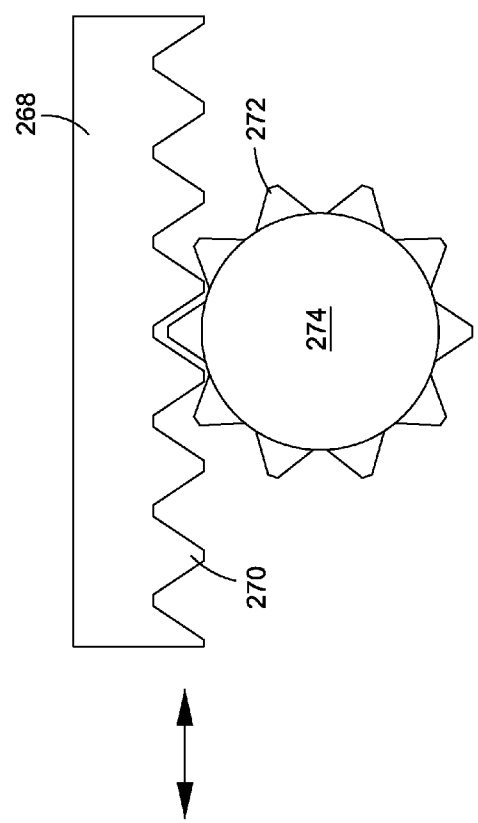
FIG. 8 is a side view of a push mechanism according to another embodiment of the disclosure.

A push mechanism 266 according to another embodiment, shown in FIG. 8, includes a push rod 268 having a plurality of teeth 270 along one edge. The teeth 270 on the rod engage a set of teeth 272 on a gear 274 rotated by a bi-directional motor. When the motor rotates the gear 272 clockwise, the push rod 268 moves in a distal direction to engage the platform 14, and when the motor rotates the gear 272 counter-clockwise, the push rod 268 moves proximally, away from the platform 14.

In each of the embodiments described above, the push rod must be sufficiently long to push down the platform 14, even when the vehicle 12 is parked on a steep hill facing downwardly. In other words, when the truck is parked at an angle relative to flat ground, the push rod must extend far enough to push the center of gravity of the platform beyond a plane extending perpendicular to the flat ground.

FIGS. 10A-D show an alternate embodiment wherein the apparatus 110, otherwise identical to the apparatus 10 of FIGS. 1-6, is provided with a crane extension 113. The crane extension 113 comprises an arm 115 having a proximal end 117 and a free distal end 119. The proximal end 117 is pivotably secured to the distal edge portion 146 of the platform 114. A crane pulley 121 is mounted on the free distal end 119, and a crane cable 123 having a hook 125 at its distal end extends between the pulley 121 and a motorized crane reel 127 mounted in the rear of the firefighting vehicle.

Figure 10A:
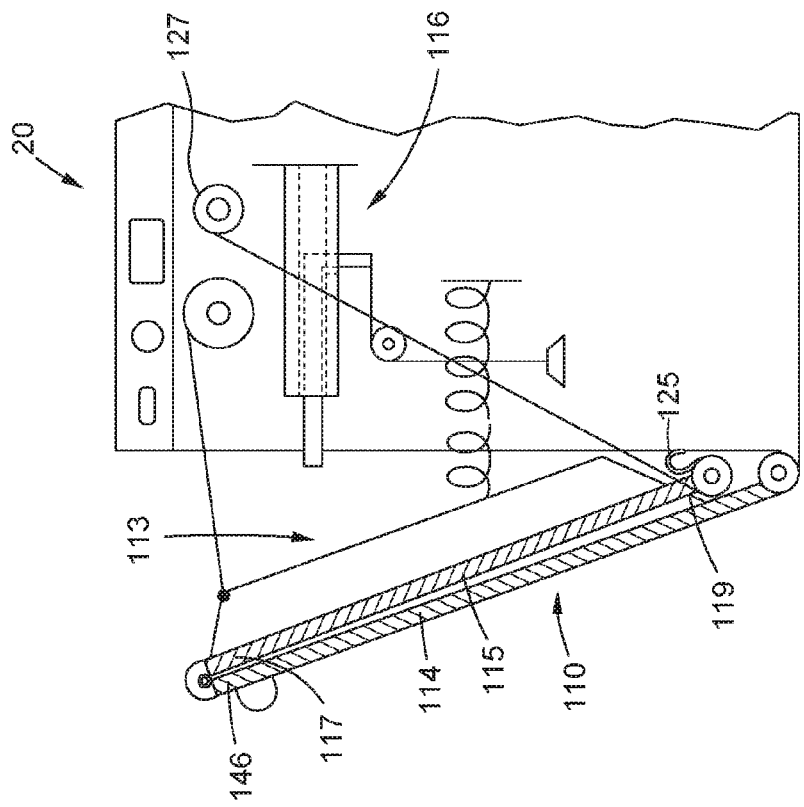
FIGS. 10A-D are fragmentary side view showing an alternate embodiment of the apparatus in various stages of deployment in the rear portion of a firefighting vehicle.
Figure 10B:
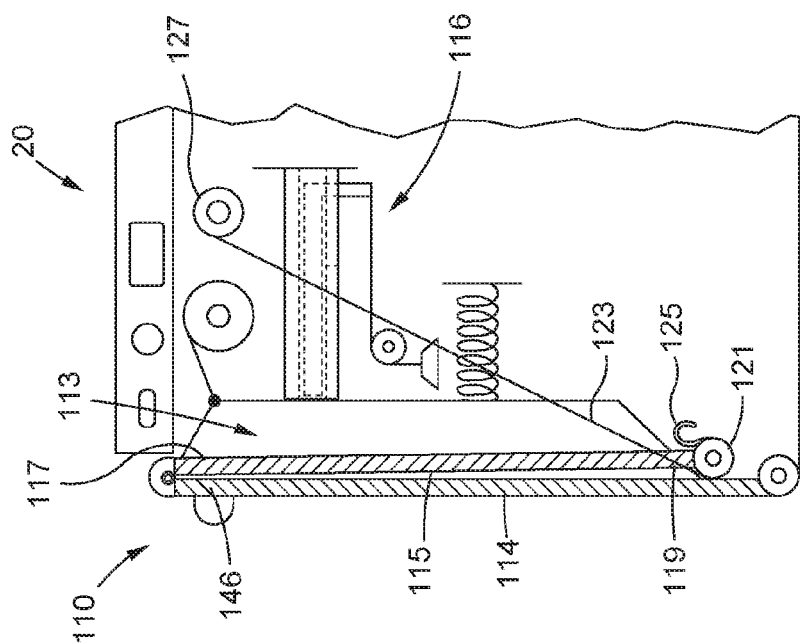
Figure 10C:
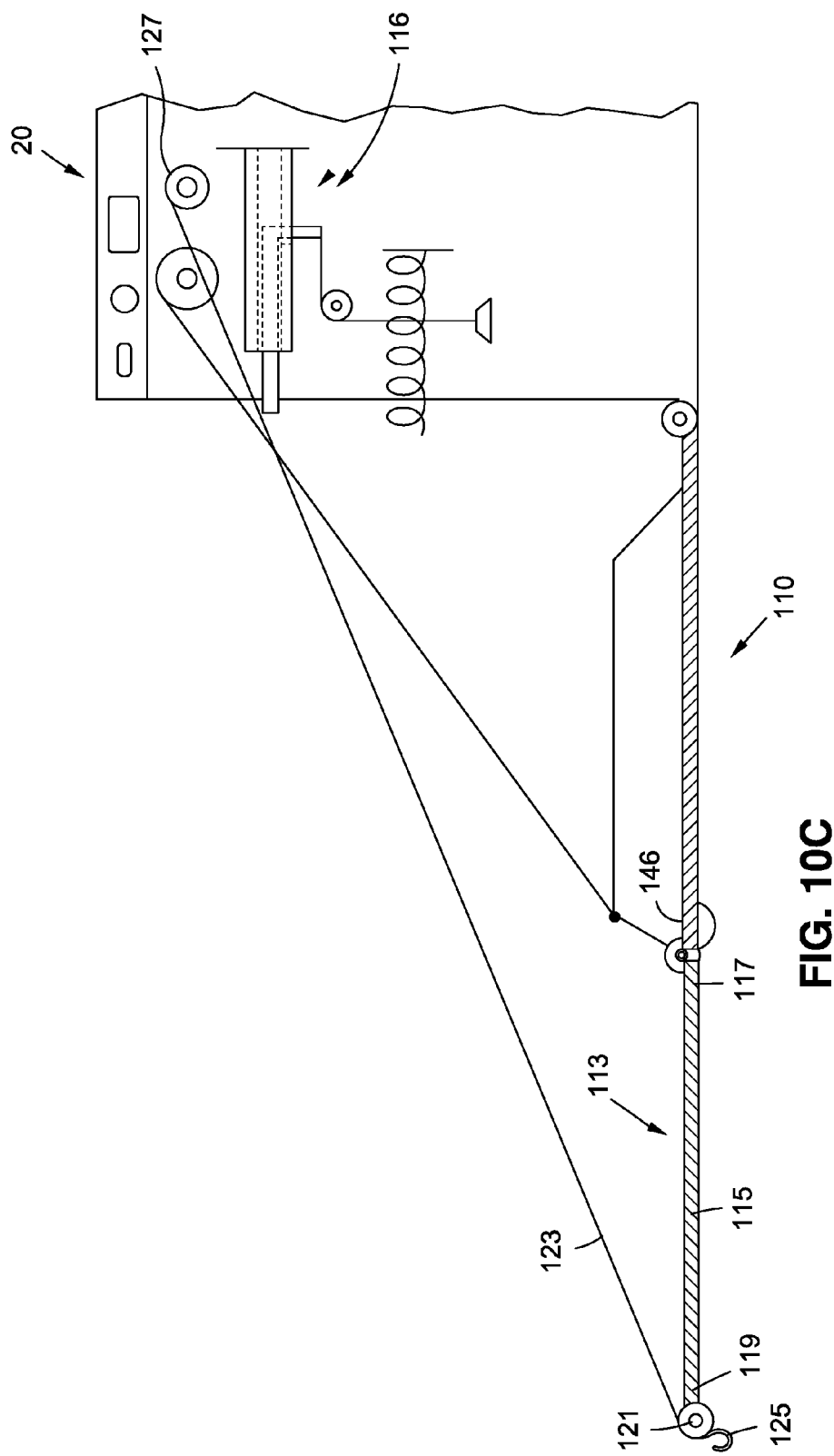

Operation of the crane extension 113 is as follows. Initially, the platform 114 is in the vertical position, with the arm 115 folded downwardly against the platform 114, as shown in FIG. 10A. When a user wishes to lower the platform 114, the actuating system 116 is deployed, pushing the platform 114 outwardly, as shown in FIG. 10B. As the platform 114 descends, the arm 115 remains folded against the platform 114 until the platform 114 reaches a horizontal position, at which point the user manually unfolds the arm 115 so that it is coplanar with the platform 114, as shown in FIG. 10C. Alternatively, a motorized mechanism may be provided for unfolding the arm 115.

Figure 10D:
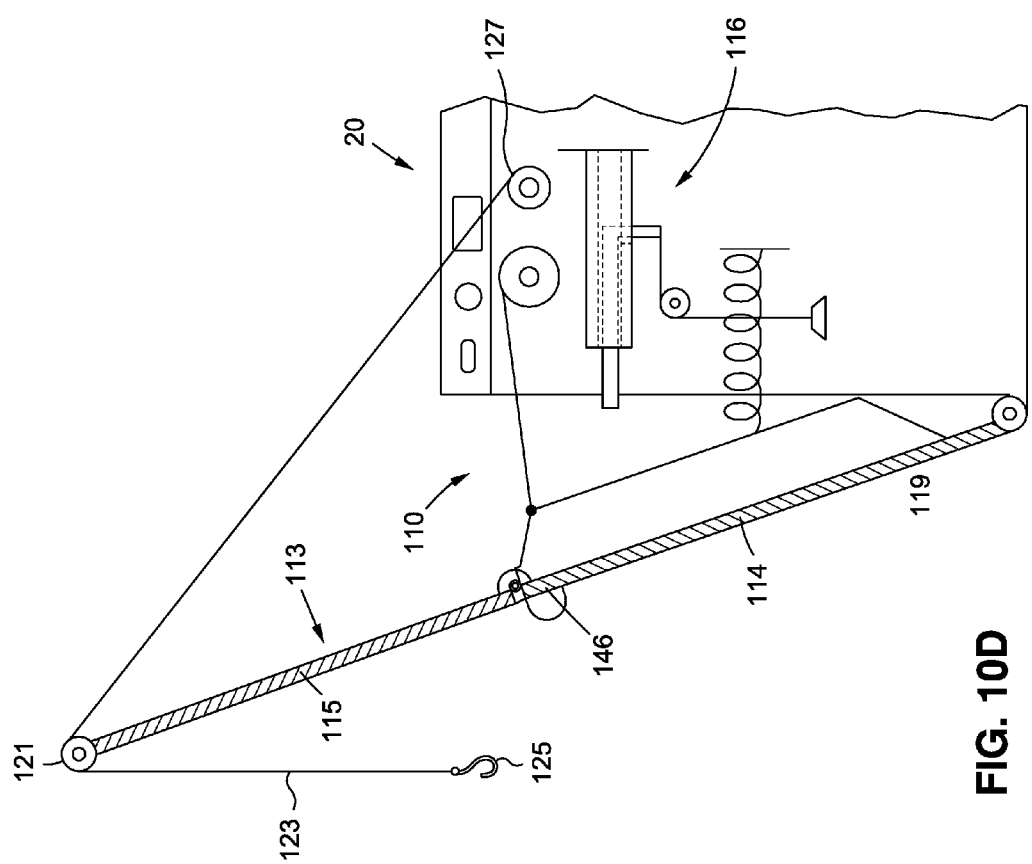

Once the arm 115 is unfolded, the user runs the actuating system 116 in the opposite direction, raising the platform 114 and extension 115 to a desired height and angle, as shown in FIG. 10D. The motorized crane reel 127 is then activated, causing the crane cable 123 to unwind from the crane reel 127 and lowering the hook 125 to a level where it can be attached to a piece of heavy equipment or other item that needs to be removed from the scene. The crane reel 127 may then be rotated in the opposite direction, raising the hook 125 and lifting the attached item.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loading system for a firefighting vehicle including a rear portion having an opening, the system comprising:
   a platform including
      a bottom wall,
      a proximal end pivotably coupled to the rear portion of the vehicle,
      a distal end opposite the proximal end, and
      a pair of side walls extending perpendicular to the bottom wall; and
   an actuating mechanism configured to pivot the platform from a stowed position wherein the platform substantially closes the opening to a final deployed position wherein the platform is angled downwardly to serve as a ramp allowing equipment to be wheeled on and off the vehicle, the actuating mechanism including
      a spring urging the distal end of the platform distally;
      a cable including a first end secured to the distal end of the platform and a second end carried on a rotatable reel mounted in the rear portion of the vehicle, wherein the cable is deployable from a fully coiled configuration holding the platform in the stowed position against the bias of the spring to a fully extended configuration corresponding to the final deployed position of the platform; and
   a push mechanism configured to initiate distal movement of the distal end of the platform, the push mechanism including
      a sleeve mounted in the rear portion of the vehicle, the sleeve including a lower surface having an elongated slot;
      a push rod disposed within the sleeve, the push rod having a proximal end and a distal end, the push rod being mounted for sliding movement from a retracted position in the sleeve to an extended position wherein the distal end of the push rod extends beyond the rear portion of the vehicle; and
      a counterweight assembly coupled to the push rod and configured to utilize gravity to cause the push rod to move from the retracted position to the extended position.

2. The loading system according to claim 1, wherein the counterweight assembly comprises:
   a connector bar having an upper end coupled to the proximal end of the push rod and a lower end extending downwardly through the slot in the sleeve;
   a counterweight pulley mounted distally of the connector bar; and
   a counterweight cable having a first end connected to the lower end of the connector bar, a second end connected to a weight, and an intermediate portion carried by the counterweight pulley;
   wherein gravitational forces acting downwardly on the weight cause the counterweight cable to move in a counterclockwise direction about the counterweight pulley, causing the connector bar and push rod to move distally toward the extended position.

3. The loading system according to claim 1, further comprising a two-way motor configured to rotate the reel.

4. The loading system according to claim 3, wherein the motor is a worm gear type motor.

5. The loading system according to claim 3, further comprising;

a control system controlling the motor; and
a sensing mechanism configured to detect the position of the platform;
wherein the control system is programmed to stop the motor when the sensing mechanism detects that the platform is in a desired position.

6. The loading system according to claim 1, wherein:
the actuating mechanism is configured to hold the platform in an intermediate position between the stowed position and the final deployed position; and
when in the intermediate position, the platform is substantially parallel to a surface on which the firefighting vehicle is parked, allowing the platform to function as a hose bed.

7. The loading system according to claim 6, further comprising a restraining system coupled to the platform and configured to secure hose against the platform when the platform is in the stowed position.

8. The loading system according to claim 1, wherein the opening is formed in a rear wall, an upper peripheral edge portion of the wall extending above the opening, and two lateral edge portions of the wall extending along opposite sides of the opening, and wherein the platform comprises:
a pair of side flanges substantially coplanar with the bottom wall of the platform and extending laterally outwardly from the side walls of the platform; and
a distal edge portion;
wherein the side flanges of the platform are configured to lie flush against the lateral edge portions of the rear wall and the distal edge portion of the platform is configured to lie flush against the upper peripheral edge portion of the wall when the platform is in the stowed position.

9. The loading system according to claim 8, further comprising at least one sealing element configured to seal the side flanges and distal edge portion of the platform against the lateral and distal edge portions of the wall of the vehicle.

10. The loading system according to claim 1, further comprising a crane extension including:
an arm pivotably coupled to a distal end of the platform; and
a pulley assembly mounted at a distal end of the arm and configured to raise and lower a hook from the distal end of the arm.

11. The loading system according to claim 10, wherein the arm includes a proximal end and is mounted for pivotable movement from:
a first position wherein the arm overlies the platform with the distal end of the arm extending toward the proximal end of the platform, to
a second position wherein the arm is coplanar with the platform with the distal end of the arm extending distally away from the distal end of the platform.

12. The loading system according to claim 10, wherein the pulley assembly comprises
a crane pulley mounted at the distal end of the arm;
a crane reel rotatably mounted in the rear portion of the vehicle;
a crane cable having a first end carried by the crane reel, a second end carrying a hook, and an intermediate portion supported by the crane pulley;
wherein rotation of the crane reel in a first direction causes the cable to move downwardly over the pulley, lowering the hook, and rotation of the crane reel in a second direction causes the cable to move upwardly over the pulley, raising the hook.

13. The loading system according to claim 1, wherein the first end of the cable is secured to the distal end of the platform proximate a first side of the platform, and further comprising:
a second cable having
a first end secured to the distal end of the platform proximate a second side of the platform; and
a second end carried on a second rotatable reel mounted in the rear portion of the vehicle;
wherein the second cable is deployable from a fully coiled configuration holding the platform in the stowed position against the bias of the spring to a fully extended configuration corresponding to the final deployed position of the platform.

14. A hose bed for a firefighting vehicle including a rear portion having an opening, the hose bed comprising:
a platform including
a bottom wall,
a proximal end pivotably coupled to the rear portion of the vehicle,
a distal end opposite the proximal end; and
a pair of side walls extending perpendicular to the bottom wall; and
an actuating mechanism configured to pivot the platform from a stowed position wherein the platform substantially closes the opening to a substantially horizontal position wherein the platform extends substantially parallel to the ground, allowing hose to be conveniently deployed from the platform, the actuating mechanism including
a spring urging the distal end of the platform distally,
a cable including a first end secured to the distal end of the platform and a second end carried on a rotatable reel mounted in the rear portion of the vehicle, wherein the cable is deployable from a fully coiled configuration holding the platform in the stowed position against the bias of the spring to a partially extended configuration corresponding to the substantially horizontal position of the platform, and
a push mechanism configured to initiate distal movement of the distal end of the platform, the push mechanism including
a sleeve mounted in the rear portion of the vehicle, the sleeve including a lower surface having an elongated slot;
a push rod disposed within the sleeve, the push rod having a proximal end and a distal end, the push rod being mounted for sliding movement from a retracted position in the sleeve to an extended position wherein the distal end of the push rod extends beyond the rear portion of the vehicle; and
a counterweight assembly coupled to the push rod and configured to utilize gravity to cause the push rod to move from the retracted position to the extended position.

15. The hose bed according to claim 14, further comprising a restraining system coupled to the platform and configured to secure hose against the platform when the platform is in the stowed position.

16. The hose bed according to claim 14, further comprising a crane extension including:
an arm pivotably coupled to a distal end of the platform; and
a pulley assembly mounted at a distal end of the arm and configured to raise and lower a hook from the distal end of the arm.

17. The hose bed according to claim 16, wherein the arm includes a proximal end and is mounted for pivotable movement from:
- a first position wherein the arm overlies the platform with the distal end of the arm extending toward the proximal end of the platform, to
- a second position wherein the arm is coplanar with the platform with the distal end of the arm extending distally away from the distal end of the platform.

18. The hose bed according to claim 16, wherein the pulley assembly comprises
- a crane pulley mounted at the distal end of the arm;
- a crane reel rotatably mounted in the rear portion of the vehicle;
- a crane cable having a first end carried by the crane reel, a second end carrying a hook, and an intermediate portion supported by the crane pulley;
- wherein rotation of the crane reel in a first direction causes the cable to move downwardly over the pulley, lowering the hook, and rotation of the crane reel in a second direction causes the cable to move upwardly over the pulley, raising the hook.

19. A combination loading system and hose bed for a firefighting vehicle including a rear portion having an opening, comprising:
- a platform including
  - a bottom wall,
  - a proximal end pivotably coupled to the rear portion of the vehicle,
  - a distal end opposite the proximal end, and
  - a pair of side walls extending perpendicular to the bottom wall; and
- an actuating mechanism configured to pivot the platform from
  - a stowed position wherein the platform substantially closes the opening, to
  - a horizontal position wherein the platform extends substantially parallel to the ground, allowing hose to be conveniently deployed from the platform, and
  - a downwardly angled position wherein the platform serves as a ramp allowing equipment to be wheeled on and off the vehicle, the actuating mechanism including
    - a spring urging the distal end of the platform distally;
    - a cable including a first end secured to the distal end of the platform and a second end carried on a rotatable reel mounted in the rear portion of the vehicle, wherein the cable is deployable from a fully coiled configuration holding the platform in a stowed position against the bias of the spring to a fully extended configuration corresponding to the final deployed position of the platform; and
    - a push mechanism configured to initiate distal movement of the distal end of the platform, the push mechanism including
      - a sleeve mounted in the rear portion of the vehicle, the sleeve including a lower surface having an elongated slot;
      - a push rod disposed within the sleeve, the push rod having a proximal end and a distal end, the push rod being mounted for sliding movement from a retracted position in the sleeve to an extended position wherein the distal end of the push rod extends beyond the rear portion of the vehicle; and
      - a counterweight assembly coupled to the push rod and configured to utilize gravity to cause the push rod to move from the retracted position to the extended position.

20. The combination loading system and hose bed according to claim 19, further comprising a two-way motor configured to rotate the reel.

21. The combination loading system and hose bed according to claim 20, further comprising;
- a control system controlling the motor; and
- a sensing mechanism configured to detect the position of the platform;
- wherein the control system is programmed to stop the motor when the sensing mechanism detects that the platform is in a desired position.

22. The combination loading system and hose bed according to claim 19, further comprising a restraining system coupled to the platform and configured to secure hose against the platform when the platform is in the stowed position.

23. The combination loading system and hose bed according to claim 19, further comprising a crane extension including:
- an arm pivotably coupled to a distal end of the platform; and
- a pulley assembly mounted at a distal end of the arm and configured to raise and lower a hook from the distal end of the arm.

24. The combination loading system and hose bed according to claim 23, wherein the arm includes a proximal end and is mounted for pivotable movement from:
- a first position wherein the arm overlies the platform with the distal end of the arm extending toward the proximal end of the platform, to
- a second position wherein the arm is coplanar with the platform with the distal end of the arm extending distally away from the distal end of the platform.

25. The hose bed according to claim 23, wherein the pulley assembly comprises
- a crane pulley mounted at the distal end of the arm;
- a crane reel rotatably mounted in the rear portion of the vehicle;
- a crane cable having a first end carried by the crane reel, a second end carrying a hook, and an intermediate portion supported by the crane pulley;
- wherein rotation of the crane reel in a first direction causes the cable to move downwardly over the pulley, lowering the hook, and rotation of the crane reel in a second direction causes the cable to move upwardly over the pulley, raising the hook.

\* \* \* \* \*